Nov. 17, 1970    SHINSUKE YOSHIKAWA ET AL    3,541,189
METHOD FOR CONTINUOUSLY MOLDING HOLLOW
ARTICLES OF THERMOPLASTIC RESINS
Original Filed March 3, 1966    3 Sheets-Sheet 1

Shinsuke Yoshikawa
Hiromitsu Makita
INVENTORS

BY Wenderoth, Lind
and Ponack,
Attorneys

Nov. 17, 1970    SHINSUKE YOSHIKAWA ET AL    3,541,189
METHOD FOR CONTINUOUSLY MOLDING HOLLOW
ARTICLES OF THERMOPLASTIC RESINS
Original Filed March 3, 1966      3 Sheets-Sheet 3
FIG. 7
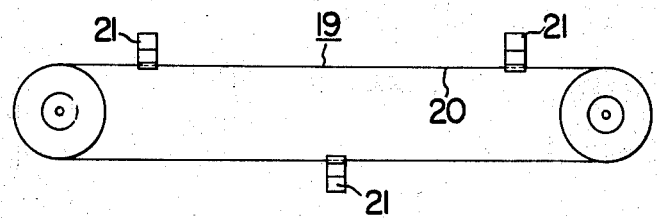
FIG. 8      FIG. 9
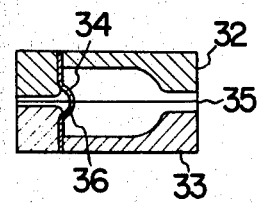 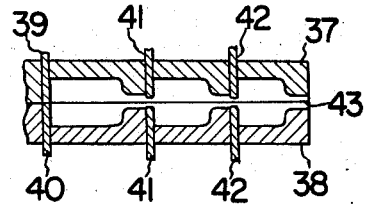
FIG. 10
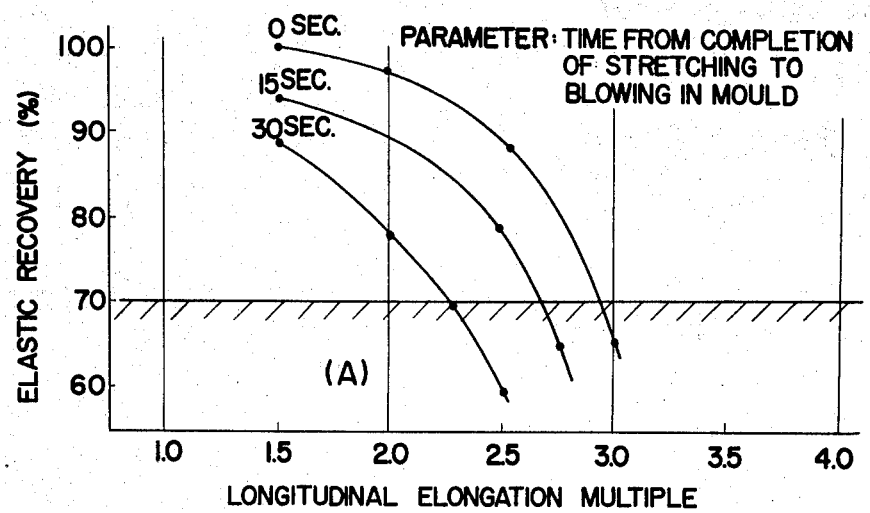
INVENTORS

3,541,189
METHOD FOR CONTINUOUSLY MOLDING HOLLOW ARTICLES OF THERMOPLASTIC RESINS

Shinsuke Yoshikawa and Hiromitsu Makita, Nakoso-shi, Japan, assignors to Kureha Kagaku Kogyo Kabushiki Kaisha, Tokyo-to, Japan
Continuation of application Ser. No. 531,399, Mar. 3, 1966. This application Aug. 4, 1969, Ser. No. 849,579
Claims priority, application Japan, Mar. 8, 1965, 40/13,207; Aug. 27, 1965, 40/52,344
Int. Cl. B29c 17/07
U.S. Cl. 264—25            3 Claims

ABSTRACT OF THE DISCLOSURE

A process of continuously moulding hollow articles of a polyvinylidene chloride resin from a continuously melt extruded tube of said resin, the method comprising the successive steps of: supercooling the tube immediately after extrusion thereof to a temperature for rendering the material of the tube into an amorphous polymer without the formation of spherulites; prestretching the cooled tube longitudinally at the optimum stretching temperature to a length corresponding to an elongation such that the elastic recovery of the tube will be at least 70 percent, enclosing the tube in its prestretched state within a mould adapted to clamp one end of the tube; introducing a fluid under pressure into the tube through the other end thereof thereby to blow and mould the tube into a hollow moulded article; and heat sealing said one end of the tube clamped by the mould thereby to form the bottom part of the hollow moulded article. The present disclosure also provides an apparatus for carrying out the above-mentioned process.

---

This application is a continuation of copending application S.N. 531,399, filed Mar. 3, 1966, and now abandoned.

This invention relates to techniques in shaping polyvinylidene chloride resins into articles and more particularly to a new method for producing hollow articles of thermoplastic resins.

The method of extruding a thermoplastic resin by means of an extruding device into the form of a tube, enclosing this tube within a split-type mould, and, as one end of the tube is clamped by one end of the mould, forcing a fluid under pressure into the other end to cause the tube to expand thereby to produce a hollow article conforming to the shape of the mould is known.

However, when a crystalline polymer of vinylidene chloride is shaped by the above described method, a lowering of the clarity and of the material properties of the article so formed due to formation of spherulites cannot be avoided.

It is an object of the present invention to provide a method for producing hollow shaped articles of polyvinylidene chloride resins whereby the clarity and material properties of the resulting articles can be improved.

According to the present invention there is provided a method for producing hollow articles shaped from polyvinylidene chloride resins which comprises: melting the resin and extruding it into a tubular structure; rapidly cooling the tubular structure to a temperature for obtaining an amorphous polymer tube (perison) without the formation of spherulites; prestretching the cooled tubular structure in its longitudinal direction at the optimum stretching temperature; placing the tubular structure so prestretched into a mould and clamping one end of the structure by means of the mould; forcing a fluid under pressure through the other end to blow the tubular structure, that is, to cause it to expand and intimately contact the mould; and heat sealing the end of the structure clamped by the mould.

Examples of polyvinylidene chloride resins suitable for producing hollow shaped articles by the method of the invention are copolymers having vinylidene chloride as a principal constituent, such as a copolymer of a vinylidene chloride and vinyl chloride or acrylic ester.

Particularly in the case of crystalline resins such as the copolymer resins of the vinylidene chloride group, the crystallization is caused by stretching to progress rapidly. For this reason, instances of blowing not being obtained in the metal mould in spite of the application of high pressure or of tearing of the tube in the longitudinal direction may occur depending on the conditions of the prestretching.

If, in order to avoid such occurrences, the resin is heated to a temperature which makes blowing possible, only shaped articles having no orientation may be produced.

A second object and unique feature of the present invention, therefore, is to establish the orientation conditions of these crystalline resins.

While vinylidene chloride resins have excellent crystallinity, if they are supercooled in a coolant such as water immediately after melt-extrusion, their amorphous state can be sustained for a period of from a number of minutes to a number of hours. During this period of amorphous state, a resin of the above mentioned group has rubber elasticity whereby, even when an external stress to cause strain such as elongation in one direction is imparted thereto, the resin material returns immediately to its original shape upon removal of the stress.

However, even within this period, if the resin is subjected to elongation of high multiple (with respect to a reference length), a sudden crystallization will occur therein, and the rubber elasticity will be completely lost, whereby the resin will no longer return to its original shape even when the external stress is removed. Since crystallization is promoted even by elongation of low multiple, if the resin is left for a certain time under such an elongation of low multiple, its elastic recovery will progressively become poor until, finally, elastic recovery will not occur even when the stress is removed.

We have discovered that there is a very close relationship between the elastic recovery and the difficulty or facility of moulding within a metal mould as well as the mechanical strength of the moulded article in the case where a supercooled, amorphous polymer tube of vinylidene chloride resin is subjected to longitudinal elongation. The present invention is based on this discovery.

According to the present invention, a polymer tube having rubber elasticity and produced by melt-extruding a crystalline resin of vinylidene chloride resin into a tubular structure and then immediately supercooling the tubular structure is stretched longitudinally within a range of elongation such that the elastic recovery of the polymer tube will be 70 percent or higher and, in this stretched state, is clamped within a metal mould, and, while the elastic recovery is of the above stated value, a difference between the internal and external pressures of the polymer tube is produced thereby to blow and mould the desired hollow article.

The term "elastic recovery" used herein refers, in the case where a rubber-like substance is stretched by an external stress and then contracts upon removal of the stress, to the ratio between the linear magnitude of contraction to that of the stretching. More specifically, in the case where a rubber-like, elastic structure of a specific length is stretched by an external force in the longitudinal direction and then is permitted to contract by removal of the force, the elastic recovery $R_E$ is herein defined by:

$$R_E = \frac{(\text{Length when stretched}) - (\text{Length after contraction})}{(\text{Length when stretched}) - (\text{Length before stretching})} \times 100$$

The lengths entering into the above relationship are all readily measurable, whereby the elastic recovery can be easily determined from the above equation.

It has been found that when this elastic recovery of a resin tube is lowered below 70 percent, it is difficult to blow the resin tube, in the case where it is to be blown in the transverse direction within a metal mould, even under high pressure, or, even when the resin tube has been blown, the moulded article taken out of the metal mould after removal of the internal pressure contracts and becomes deformed.

Furthermore, in the case when a polymer tube clamped with a metal mould is not completely crystallized, since it is difficult to stretch only those parts of the polymer tube in which crystallization has progressed, there is produced an irregular distribution of physical strength, and the moulded article becomes readily tearable in the longitudinal direction.

It has been found that an elastic recovery of 80 percent or higher and 95 percent or lower immediately after stretching is preferable. If the elastic recovery is less than 70 percent, the rate of crystallization will be high, and the elastic recovery will rapidly decrease. Consequently, the cycle of longitudinal stretching—clamping in the metal mould—blowing and moulding cannot be carried out uniformly, and, moreover, there is a high probability of deviations occurring in the quality of the moulded articles because of occurrences such as interruptions of short periods.

While it is possible, of course, to carry out the moulding in cases where the elastic recovery is 95 percent or higher, since the decrease in elastic recovery from 100 percent to 95 percent, in general, is rapid, differences in the degree of crystallization tend to arise between the two ends of a stretched tube when it is clamped in a metal mould and moulded into a hollow article. As a result, in some cases, when several of such articles are taken out of the metal mould, they are not uniform because of deformations. This does not become a problem, of course, when a single-cavity mould is used instead of a multiple-cavity mould.

The nature, principle, and details of the invention will be more clearly apparent from the following detailed description with respect to a preferred embodiment of the moulding method and apparatus according to the invention as illustrated in the accompanying drawings in which like parts are designated by like reference numerals.

In the drawings:

FIG. 7 is a side elevational view of a take-up device;

FIG. 8 is a side elevational view, in vertical section, showing a single-cavity mould;

FIG. 9 is a view similar to FIG. 8 showing a multiple-cavity mould; and

FIG. 10 is a graphical representation indicating the relationship between elastic recovery and longitudinal elongation for various process time intervals.

Figure 1:
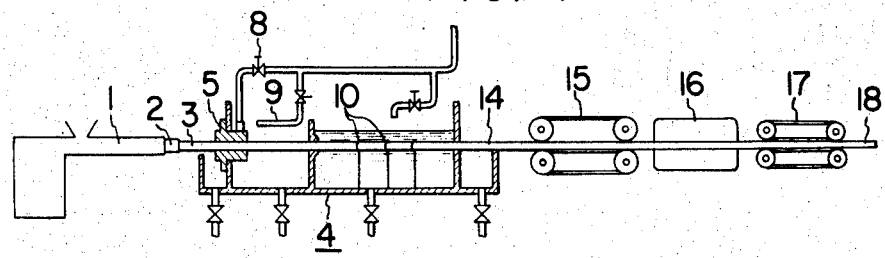
FIG. 1 is a schematic side elevational view generally showing the essential parts of the section for melt extrusion, super-cooling, and prestretching of a moulding apparatus embodying the invention.

The section of the apparatus of the invention for melt extruding and stretching a supercooled tubular structure in its longitudinal direction is shown in FIGS. 1 through 4, inclusive. In the operation of this section, a polyvinylidene chloride resin is melted in an extruder 1 and extruded through a die 2 into a molten tubular structure 3, which is then cooled to a required temperature (from 5 to 30 degrees C.) by a cooling device 4.

The cooling device 4 comprises, essentially, a cooling die 5 having a construction adapted to inject a pressurized cooling fluid through its inner wall toward the tubular structure, a perforated pipe 9 for sprinkling cooling fluid, and a cooling bath containing cooling fluid through which the tubular structure is passed and having rings 10 for holding the tubular structure within the cooling fluid.

Figure 2:
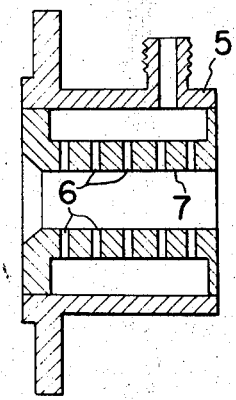
FIG. 2 is a vertical sectional view of a cooling die suitable for use in the apparatus shown in FIG. 1.
Figure 3:
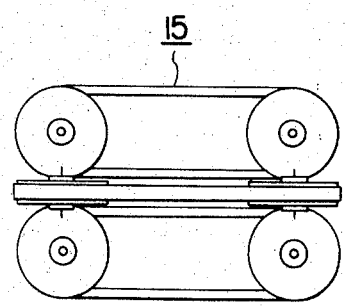
FIG. 3 is a side elevational view of a take-up device suitable for use in the apparatus.

The cooling die 5, as shown in detail in FIG. 2, has a large number of nozzles 6 through its inner wall 7 for injecting cooling fluid, which is supplied through a pipe provided with a control valve 8 to a header chamber surrounding the outer ends of the nozzles 6. The flowrate of the cooling fluid is so regulated by the control valve 8 that the tubular structure 3 is centered within the die without contacting the inner wall 7.

The tabular structure 14 which has been cooled in the above described manner is taken up at a constant speed by a take-up device 15 and then taken by another take-up device 17 having the same construction as the device 15 but operated at a higher working surface speed than that of the device 15, whereby the tubular structure 14 is elongated longitudinally by a multiple of from 1 to 4 into a tube 18. The tube 18 is transferred at the same speed as the working surface speed of the take-up device 17.

The optimum stretching temperature differs with the kind of thermoplastic resin used. When necessary, a heating device 16 can be provided between the take-up devices 15 and 17 to heat the cooled tubular structure 14 and maintain it at the optimum stretching temperature.

Figure 4:
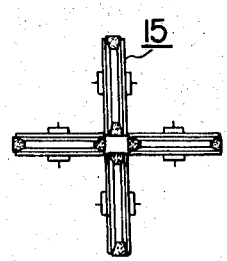
FIG. 4 is an end elevational view orthogonally corresponding to FIG. 3.
Figure 5:
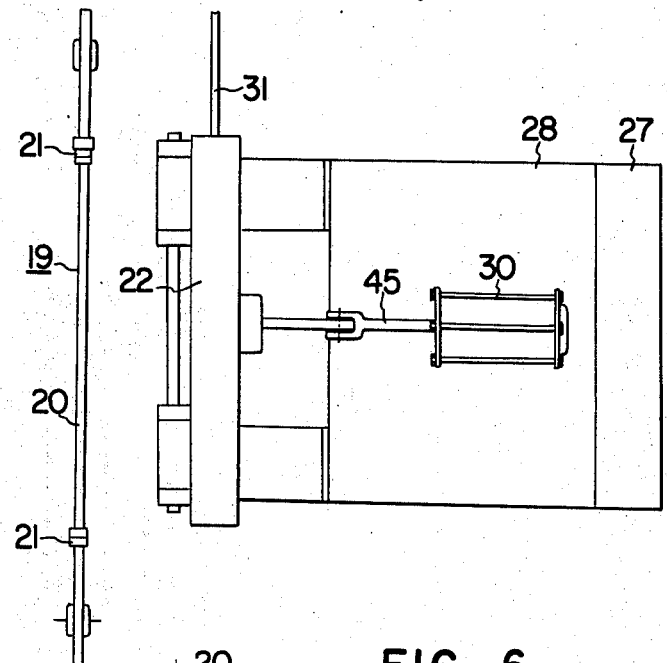
FIG. 5 is a simplified plan view of a moulding machine suitable for use in conjunction with and as a part of the apparatus shown in FIG. 1.

The take-up devices 15 and 17 are so constructed, as illustrated by one example in FIGS. 4 and 5, that a plurality of endless belts stretched on rollers are arranged to grasp the peripheral surface of the tubular structure 14, which is thus caused by the friction between the belt surfaces and tubular structure surface to move with the belt surfaces.

Figure 6:
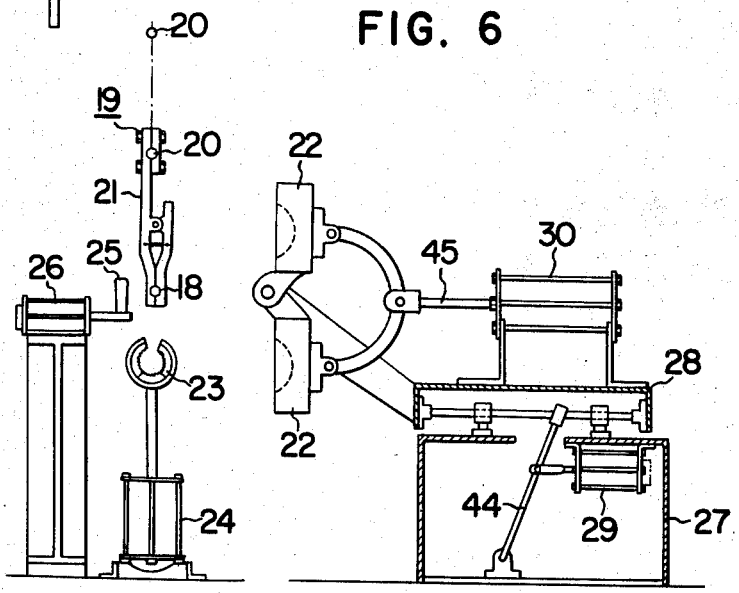
FIG. 6 is a side elevational view of the moulding machine shown in FIG. 5.

The section of the apparatus for clamping the tube 18 which has been longitudinally stretched in a mould and moulding the tube into a hollow moulded article by introducing thereinto a fluid under pressure is shown in FIGS. 6, 7, and 8. The stretched tube 18 is clamped and drawn out by a clamp (or clip) 21 mounted on an endless belt 20 of a draw-out device 19, the belt 20 moving at a speed which is slightly higher than that of the tube 18.

The tube 18 thus drawn out is passed through a heater 23, which can be raised or lowered by means of an air cylinder 24, and heated when necessary to the optimum stretching temperature of the thermoplastic resin of the tube, which temperature is higher than the second order transistion temperature and lower than the melting point. The tube 18 is drawn out as it is heated by the heater 23, and when the drawn out length reaches a specific length determined by a mould 22, the movement of the tube is stopped by means (not shown) such as a limit switch or a cam.

The mould 22 is opened and closed through a rod 45 by an air cylinder 30 mounted on a platen 28 which is supported on a bed 27 in a manner such that the platen 28, together with the mould 22 and air cylinder 30 mounted thereon, can be moved left and right, as viewed in FIGS. 6 and 7, by an air cylinder 29 acting by way of an arm 44.

When the tube 18 has been drawn out to the aforementioned specific length and has stopped, the heater 23 is lowered by the air cylinder 24. Simultaneously, the piston of the air cylinder 29 pushes the arm 44, and, together with the platen 28 to which the arm 44 is connected, the mould 22 in its opened state approaches the tube 18 which has thus been drawn. Then, when the piston of the air cylinder 30 pushes the rod 45, the mould 22 is closed about the tube 18. At the same time, the clamp 21 is opened, and the mould 22 is retracted by the air cylinder 29, whereby the work path for the drawing out of the succeeding length of the tube 18 is cleared.

However, since the tube 18 is being fed at a constant speed from the take-up device 17 during also the period in which the clamp 21 is stopped, this length so fed is compensated for by adjustment of intermittent movement and constant-speed movement by means of a dancing roller (now shown) installed downstream from the take-up device 17.

When the mould 22 has been closed, and the rear (downstream) end of the tube 18 has been clamped and closed by the mould 22, a nozzle 31 for introducing a fluid under pressure is inserted through the front (upstream) end of the mould 22 and fitted into the tube 18. The fluid is then introduced under pressure into the tube 18, which is thereby blown by the internal pressure and, contacting the inner wall of the mould of the specified shape, is cooled, whereby the shape of the article thus moulded is set.

The shape of the mould cavity is as shown in FIGS. 9 and 10, the mould in each case being divided into two halves 32 and 33, and an electrode 34 being installed in one of the halves.

In the aforementioned moulding process, the tube 18 which has reached the optimum stretching temperature is enclosed by this mould, being clamped at the position for the downstream end 36. The fluid is then introduced under pressure through the other (upstream) end 35 to blow the tube, which is thereby shaped into a hollow moulded article to which stretching effect has been imparted.

During this process, the tube at its part clamped by the mould is forcibly flattened and deformed but is not yet bonded or sealed. To seal this part thoroughly, it is heat sealed, simultaneously with the completion of moulding, through the use of the electrode 34 and by means such as a high-frequency means, a heating plate, or ultrasonic means (not shown).

This moulding method is applicable not only to a mould for a single blown part but also to a mould for an article consisting of several continuously connected blown parts as shown in FIG. 10. The mould in this example can be divided into two halves 37 and 38 and is provided therein with stationary electrodes 39 and 40 movable electrodes 41 and 42.

In the operation of this mould, the tube which has reached the optimum stretching temperature is enclosed within the two mould halves 37 and 38, one end of the tube being clamped by the stationary electrode 39 and 40, and the fluid is introduced under pressure through the other end 43. During this step, the movable electrodes 41 and 42 are in their respective retracted positions, and gaps remain in the tube at these positions. Accordingly, the pressurized fluid passes through these gaps to fill the plurality of parts to be blown.

Upon completion of the blowing moulding step, the internal pressure of the fluid is removed, and the movable electrodes 41 and 42 are pressed against the tube at its positions to be clamped. Then, by means such as high-frequency means, a heating plate, or ultrasonic means (not shown), the necked parts of the moulded article are heat sealed simultaneously with the clamped position by the stationary electrodes being heat-sealed, whereby, by taking the article out of the mould and cutting it at its divisional parts, several moulded articles can be produced by one process cycle. Alternatively, cutting means may be provided within the mould whereby divided moulded articles can be taken out immediately.

In the above described process, wherein the tube is stretched longitudinally between the take-up devices 15 and 17 and then, in the succeeding step, is blown by introducing therein a fluid under pressure and thereby moulded into a hollow moulded article, crystallization of the resin article will progress under merely the longitudinal stretching if the degree of the stretching is high, or if the process time from the stretching to the clamping within the mould and blowing is long. Consequently, as soon as the moulded article which has thus been blown and moulded is taken out of the mould, it contracts. As a result, a hollow moulded article of the desired shape cannot be obtained, or, in the case where the longitudinal stretching is excessive, longitudinal rupturing of the tube may occur, whereby blowing cannot be accomplished.

FIG. 10 indicates the occurrence of this defective moulding in the case of a vinylidene chloride resin and of an elastic recovery of less than 70 percent. The crosshatched part (A) of FIG. 10 corresponds to the region of defective moulding.

In the process step of blowing the tube in the mould, preheating of the mould to a temperature which is equal to or higher than the crystallization temperature of the resin, for example, 40 degrees C. in the case of a vinylidene chloride resin, and equal to or less than the melting point of the polymer is advantageous since, then, the rate of crystallization of the moulded articles is promoted, and, moreover, heat setting occurs within the mould with result that the efficiency is increased, and, in addition, dimensional stability of the moulded articles is attained.

A vinylidene chloride resin suitable for use in the practice of the present invention is a vinylidene chloride polymer or a copolymer obtained from a mixture of 50 percent or more of vinylidene chloride monomer and one or more monomers selected from among monomers which are polymerizable with vinylidene chloride, examples of said monomers being monomers of: olefins such as vinyl chloride, vinyl acetate, vinyl ether, acrylonitrile, and styrene allyl chloride; diolefins such as butadiene, isoprene, chloroprene, and 1,4-dichloro-2,3-butadiene; unsaturated fatty acids such as acrylic acid, metaacrylic acid, maleic acid, and fumaric acid and anhydrides thereof and esters thereof; and esters of alcohols having unsaturated radicals such as allyl, methallyl, crotonyl, and cinnamyl and carboxylic acid.

As described above, the present invention provides a method and apparatus for continuously extruding thermoplastic resins into tubular shape and successively moulding the same into hollow moulded articles, and since the resin in each case is stretched longitudinally and transversely at a stretching temperature which is equal to or higher than the sound-order transition temperature and equal to or lower than the melting point thereof, spherulites are not formed and the clarity and material properties can be improved in the case of crystalline resins, and the mechanical strength can be increased also in the case of amorphous resins.

Thus, the present invention provides a method and apparatus for moulding hollow articles whereby strong moulded articles can be efficiently produced singly or severally with one cycle of operation and continuously from the melting of the resin as increase in the strength of the resin due to molecular orientation is attained.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A process for continuously molding hollow articles of a polyvinylidene chloride resin from a continuously melt extruded tube of said resin, comprising the successive steps of: supercooling the tube immediately after extrusion thereof to a temperature for rendering the tubular material into an amorphous polymer without the formation of spherulites; prestretching the cooled tube longitudinally at a stretching temperature higher than the second order transition temperature but lower than the melting point of polyvinylidene chloride, said cooled tube being prestretched to a length corresponding to an elongation such that the elastic recovery of the tube is at least 70%; introducing the tubular material into a mold and clamping one end of the tube in the metal mold; forcing a fluid under pressure into the tube through the end thereof to blow and expand the tubular material into intimate contact with the mold, thereby forming hollow molded articles; and heat sealing one end of the tube clamped by the mold simultaneously with completion of the expansion of the tube by means of electrodes provided in the mold.

2. A process according to claim 1 in which the elastic recovery range of the prestretched tubular material is between 80% and 95%.

3. A process according to claim 1 in which the heat sealing is done by high frequency means.

References Cited

UNITED STATES PATENTS

| 2,562,523 | 7/1951 | Brunet | 264—98 X |
| 2,919,462 | 1/1960 | Friden | 264—99 |
| 3,231,652 | 1/1966 | Goldman | 264—95 |
| 3,288,317 | 11/1966 | Wiley | 264—98 X |
| 3,294,885 | 12/1966 | Cines et al. | 264—99 |

FOREIGN PATENTS 12,532  8/1962  Japan.

ROBERT F. WHITE, Primary Examiner

T. J. CARVIS, Assistant Examiner

U.S. Cl. X.R.

18—5; 264—99